(12) United States Patent
Brault et al.

(10) Patent No.: US 6,500,009 B1
(45) Date of Patent: Dec. 31, 2002

(54) CPR MANIKIN WITH OPTIONAL AUTOMATIC EXTERNAL DEFIBRILLATION

(75) Inventors: Richard A. Brault, Toronto (CA); Dianne B. Croteau, Toronto (CA)

(73) Assignee: Vital Signs, Inc., Totawa, NJ (US)

( * ) Notice: Subject to any disclaimer, the term of this patent is extended or adjusted under 35 U.S.C. 154(b) by 137 days.

(21) Appl. No.: 09/586,283

(22) Filed: Jun. 2, 2000

Related U.S. Application Data (63) Continuation-in-part of application No. 09/442,508, filed on Nov. 18, 1999.

(51) Int. Cl.⁷ .............................................. G07B 23/28
(52) U.S. Cl. ...................................................... 434/265
(58) Field of Search ................................ 434/265, 270, 434/262, 267

(56) References Cited

U.S. PATENT DOCUMENTS

| | | | | |
|---|---|---|---|---|
| 3,199,225 A | * | 8/1965 | Robertson | 434/265 |
| 3,209,469 A | | 10/1965 | James | 35/17 |
| 3,401,471 A | | 9/1968 | Hasse | 35/17 |
| 3,562,925 A | | 2/1971 | Baermann et al. | 35/17 |
| 3,872,609 A | | 3/1975 | Smreto | 35/17 |
| 3,916,535 A | | 11/1975 | Hewson | 35/17 |
| 399,075 A | | 11/1976 | Kohnke | 35/17 |
| 4,619,617 A | | 10/1986 | Rice | 434/265 |
| 4,797,105 A | | 1/1989 | Green | 434/265 |
| 4,802,857 A | * | 2/1989 | Laughlin | 434/265 |
| 4,984,987 A | | 1/1991 | Broult et al. | 434/265 |
| 5,195,896 A | * | 3/1993 | Sweeney | 434/265 |
| 5,238,409 A | | 8/1993 | Brault | 434/265 |
| 5,249,968 A | | 10/1993 | Bravit | 434/265 |
| 5,256,070 A | | 10/1993 | Garth et al. | 434/265 |
| 5,286,206 A | | 2/1994 | Epstein et al. | 434/265 |
| 5,312,259 A | | 5/1994 | Flynn | 434/265 |
| 5,330,514 A | * | 7/1994 | Egelandsdal | 434/265 |
| 5,593,306 A | | 1/1995 | Kohrke | 434/267 |
| 5,423,685 A | | 6/1995 | Adamson et al. | 434/265 |
| 5,468,151 A | | 11/1995 | Egelandsdal | 434/365 |
| 5,540,952 A | | 7/1996 | Scheinberg | 434/265 |
| 5,628,633 A | | 5/1997 | Lehman | 434/265 |
| 4,801,268 A | | 1/1999 | Kohnke | 434/265 |
| 5,885,084 A | | 3/1999 | Poetrick et al. | 434/265 |

FOREIGN PATENT DOCUMENTS

| | | | |
|---|---|---|---|
| GB | 973350 | 10/1964 | |
| GB | 1250059 | 10/1971 | ........... G09B/19/00 |
| NO | 98767 | 11/1961 | |

* cited by examiner

*Primary Examiner*—Derris H. Banks
*Assistant Examiner*—Kurt Fernstrom
(74) *Attorney, Agent, or Firm*—R. Gale Rhodes, Jr.

(57) ABSTRACT

Apparatus for practicing cardiopulmonary resuscitation (CPR) including a torso, a breast plate, a lung, and a hollow head including a mouth means, the breast plate is mounted pivotally to the torso, the lung resides intermediate the torso and the breast plate and is mounted to the torso and extends into the hollow head member and a second head member mounted to the first head member for sliding arcuate movement with respect thereto to perform jaw thrusts in the practice of CPR. Apparatus simulating the human head. Stackable torsos with breast plates mounted thereto and stackable head members each comprising a portion of a head.

36 Claims, 11 Drawing Sheets

CPR MANIKIN WITH OPTIONAL AUTOMATIC EXTERNAL DEFIBRILLATION

CROSS-REFERENCE TO RELATED APPLICATIONS

This application is a continuation-in-part application of application Ser. No. 09/442,508 filed Nov. 18, 1999, entitled CPR MANIKIN WITH OPTIONAL AUTOMATIC EXTERNAL DEFIBRILLATION, Richard A. Brault and Dianne B. Croteau, inventors, and assigned to the same assignee as the present application.

BACKGROUND OF THE INVENTION

This invention relates generally to a manikin for teaching and practicing cardiopulmonary resuscitation (CPR) and which CPR manikin, if desired, may also provide the feature of teaching and practicing automatic external defibrillation (AED). This invention further relates to apparatus for simulating the human head.

Numerous CPR manikins are known to the prior art. The prior art CPR manikins range from the very complex including numerous component parts which make the manikin very expensive to very simplistic CPR manikins which include few parts and are relatively inexpensive but which do not always permit the teaching and practice of all the techniques for CPR.

Generally, to be desirable and acceptable, CPR manikins must have sufficient structural elements to permit people to teach and practice the proper sequence of steps in the practice of CPR, must provide sufficient realism and feed back to the student learning CPR, and must be hygienic and easy to clean. Such sequence of steps in the practice of CPR, as known to those skilled in the art of teaching and practicing CPR utilizing a CPR manikin, includes chest compression, head tilts, jaw thrusts, and abdominal compression.

Recent advances in technology have made AED more accessible to the general public. Defibrillators are now seen in public venues, on aircraft, ships, and the like. The American Red Cross and the American Heart Association have created training programs particularly catering to the widespread teaching of AED as a component of the standard CPR training course. Most CPR and AED training programs given by the American Red Cross and the American Heart Association take place in workplaces such as offices and factories. As such, CPR and AED instructors must carry the CPR manikins and other equipment to the training site. CPR manikin portability and compactness are therefore important factors for instructors who, to be efficient, must bring as many CPR manikins as possible to the training site to increase the overall efficiency of the class, and desirably, provide each student with their own CPR manikin. More CPR manikins save time, make the teaching of CPR more efficient and more personal to each student, and lower the cost of teaching.

Accordingly, there is a need in the art for a relatively simple, low-cost CPR manikin that provides for the teaching and practice of the proper sequence of steps for practicing CPR including advanced techniques such as, for example, jaw thrusts.

There is a further need in the art for a CPR manikin which facilitates the placement thereon of AED electrodes for teaching AED in combination with CPR training.

There is a still further need in the art for a CPR manikin that is light weight, easily assembled and disassembled, whose parts are stackable and light weight to facilitate and reduce the cost of transportation and storage Further, there is a need in the art for a CPR manikin whose component parts are made of a material that can be recycled at the end of its functional life allowing the material to be re-used and kept in the service of industry thereby avoiding landfill and/or incineration environmental problems.

Numerous apparatus are known to the art for simulating the human head. Simulations of the human head have many applications, such as, for example, in the teaching of the structure and function of elements comprising the human head such as the jaw. Human head simulations are used widely in various types of manikins including CPR manikins. Accordingly, there is a need in the art for a new and improved apparatus simulating the human head which is relatively simple, low cost, and which can be readily and easily disassembled for cleaning and which can be disassembled for stacking to facilitate transport and storage.

SUMMARY OF THE INVENTION

The objects of the present invention are to satisfy the foregoing needs in the art.

Apparatus for practicing cardiopulmonary resuscitation (CPR) and which apparatus satisfies certain of the foregoing needs includes, a torso, a breast plate, a lung and a hollow head including a mouth, the breast plate being mounted pivotally to the torso, the lung residing intermediate the torso and the breast plate and mounted to the torso and extending into the hollow head and out the mouth, the head including a first head member and a second head member mounted pivotally to the first head and for sliding arcuate movement with respect thereto to perform jaw thrusts in the practice of CPR.

Apparatus for simulating the human head and satisfying certain other of the foregoing needs includes a head including a first head member and a second head member, said first head member being substantially hollow, having an open bottom and a first mouth opening, said second head member including a jaw and having a second mouth opening, said second head member for being mounted pivotally to said first head member and for sliding arcuate movement with respect thereto, the second mouth opening including an inwardly extending hollow cylindrical tube for being inserted through the first mouth opening and into the first head member.

Stackable torsos with breast plates mounted thereto and stackable head members each comprising a portion of a head.

DETAILED DESCRIPTION OF THE PREFERRED EMBODIMENT

Figure 1:
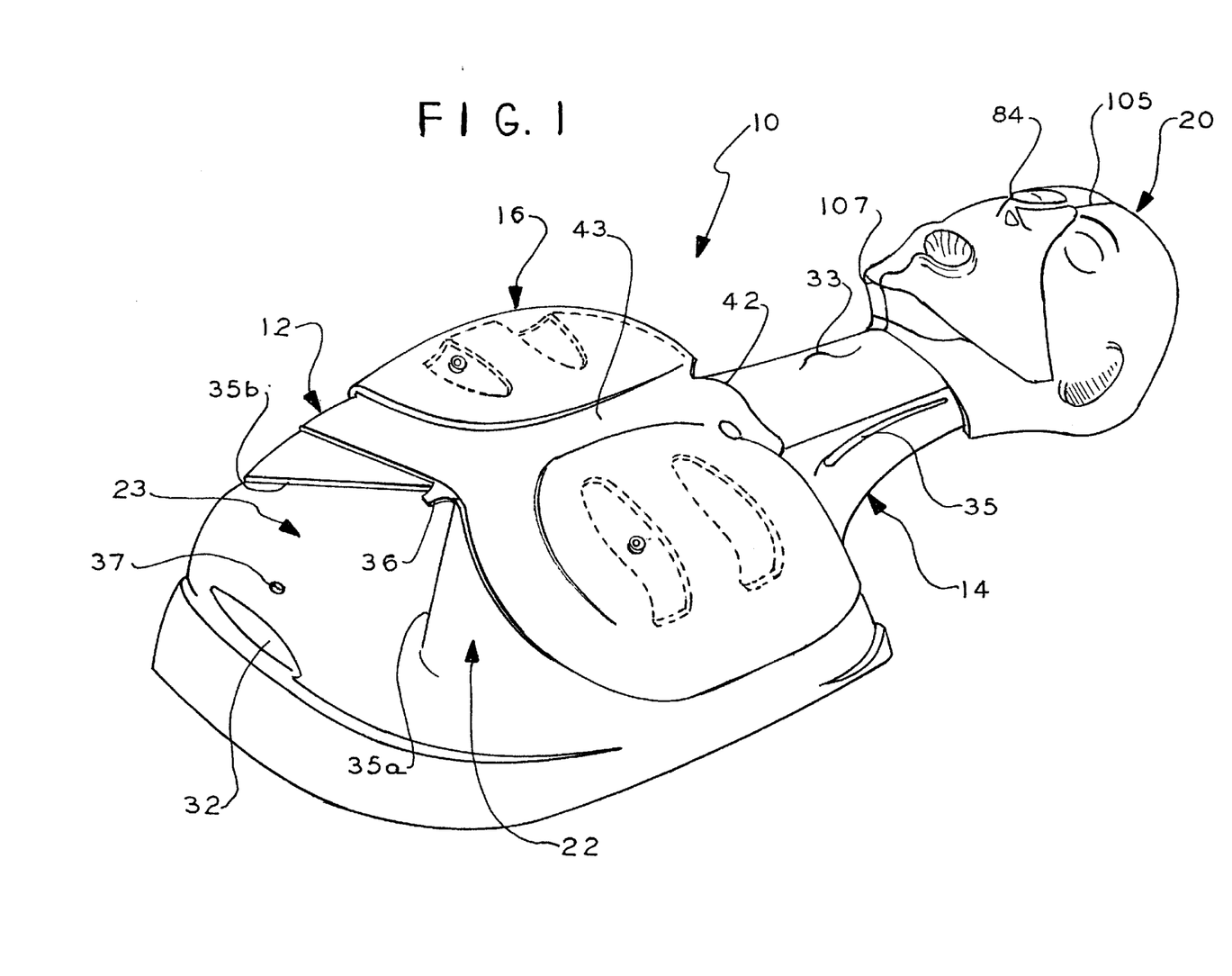
FIG. 1 is a perspective view of a fully assembled CPR manikin embodying the present invention.
Figure 2:
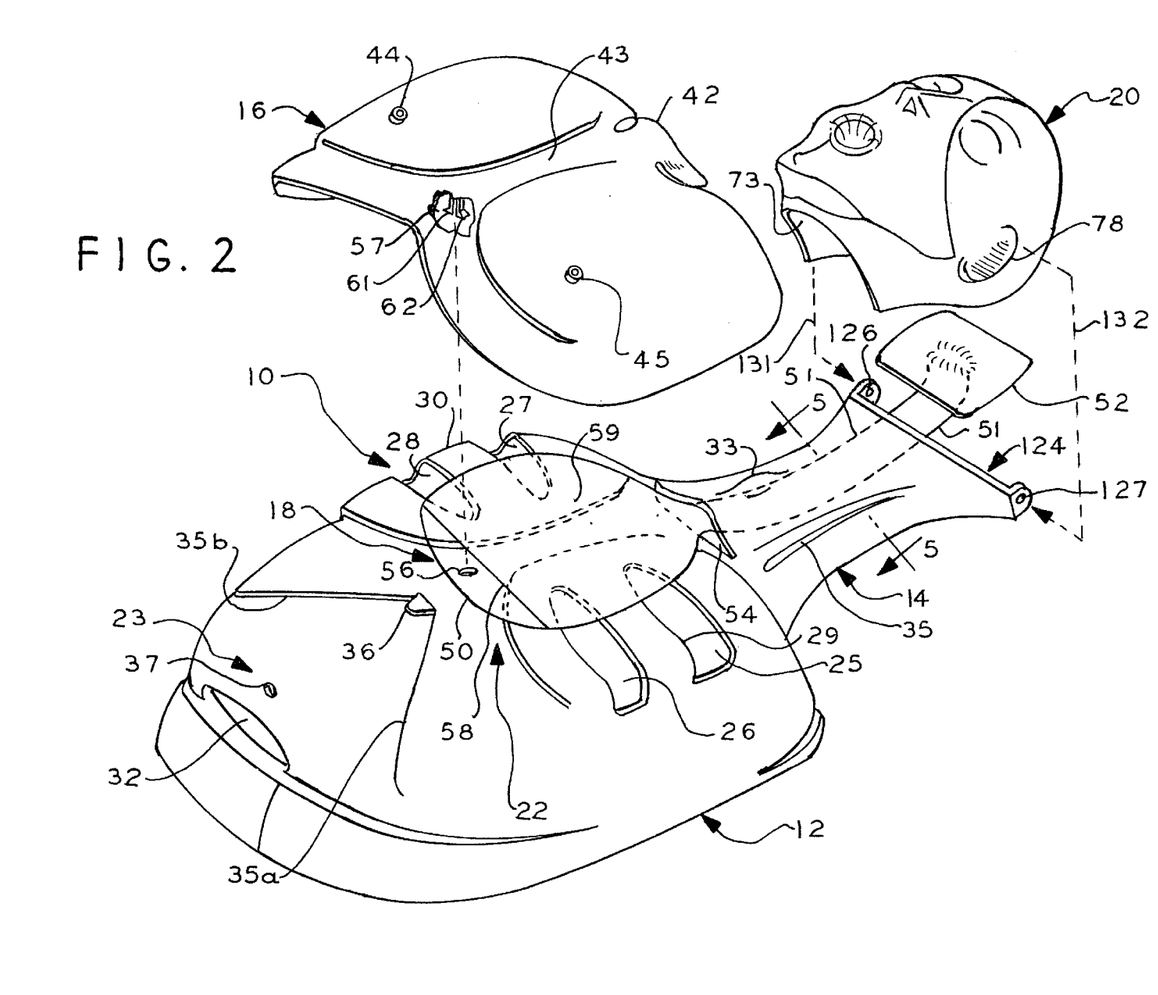
FIG. 2 is an exploded view of the CPR manikin shown in FIG. 1.

Referring to FIGS. 1 and 2, a CPR manikin embodying the present invention is shown and indicated by general numerical designation 10. CPR manikin 10 includes a torso indicated by general numerical designation 12 and which includes an integrally formed neck indicated by general numerical designation 14, a chest plate indicated by general numerical designation 16, a lung indicated by general numerical designation 18 (FIG. 2) and a head indicated by general numerical designation 20; it will be understood that the lung 18 is not shown in FIG. 1 because the end portion of the lung which extends outwardly of the mouth would obscure some of the manikin features shown in FIG. 1, particularly the mouth.

Figure 3:
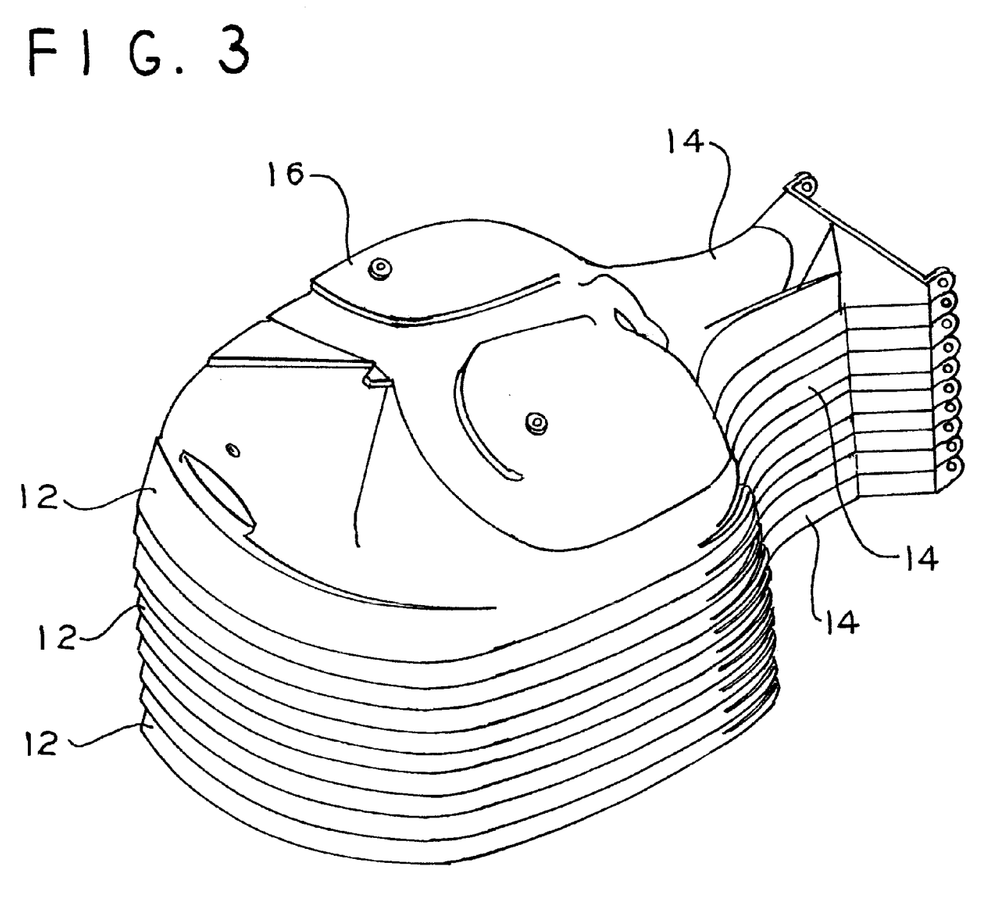
FIG. 3 illustrates the vertical stacking of the torso and neck components of the CPR manikin of the present invention to facilitate storage and transportation.

The torso 12, FIGS. 1 and 2, is a single half shell with tapered sides, completely open on the underside, allowing for efficient stacking to facilitate storage and transportation; alternatively, the torso 12 may be understood to be a generally semi-spherical hollow dome completely open at the bottom. As shown in FIG. 3, a plurality of torsos 12 and integrally formed necks 14, with the breast plates 16 attached to the torsos in a manner described in detail below, may be stacked vertically as shown in FIG. 3 for convenience of storage and transportation. The torso 12 may be made from suitable light weight and resilient plastic, such as for example polypropylene, for repeated chest compressions in the practice of CPR, and may be made by suitable manufacturing techniques known to the art such as by injection molding; in the preferred embodiment, the torso 12 and neck 18 are formed integrally and hence the neck 14 will be formed of the same light weight resilient material as the torso 12. The torso 12, particularly FIG. 2, includes a chest portion indicated by general numerical designation 22 and an abdominal portion indicated by general numerical designation 23. As shown particularly in FIG. 2, the torso chest portion 22 includes pairs of generally opposed slots 25 and 26 and 27 and 28. These slots provide ribs 29 and 30, respectively, therebetween and these slots and ribs allow the material, e.g. the above-noted polypropylene, comprising the chest portion 12, to flex much like a human rib cage does during chest compressions. The abdominal portion 23 of the torso 12, FIGS. 1 and 2, may be provided with an abdominal slot 32 causing the abdominal portion 23 to flex during the practice of abdominal thrusts in the teaching and practice of CPR. It has been found that by making the torso 12 of polypropylene, such material allows for repeated compressions of the chest and abdomen without material fatigue or memory loss.

It will be further understood that the torso 12 of the present invention includes other anatomical features enhancing its usability in the teaching and practice of CPR, such as for example, neck portion 14 is provided on its opposed sides with an upwardly extending protrusion 33 simulating the human Adam's apple. Also, the neck 14 is provided with a pair of opposed and inwardly extending grooves 35, only one being shown in FIGS. 1 and 2, but it will be understood that another such groove 35 is provided on the opposite side of the neck 14, and which grooves simulate the carotid arteries extending along the sides of the neck of a human being. Further, the torso chest portion 22 is provided with a lowermost rib lines 35a and 35b, an outwardly and upwardly generally trapezoidally shaped protrusion 36 simulating the xiphoid process of the human sternum, and a generally circular indentation 37 in the torso abdominal portion 28 simulating the human navel; these anatomical simulations are included to assist and bring realism to the teaching and practice of CPR with the CPR manikin 10.

Figure 4:
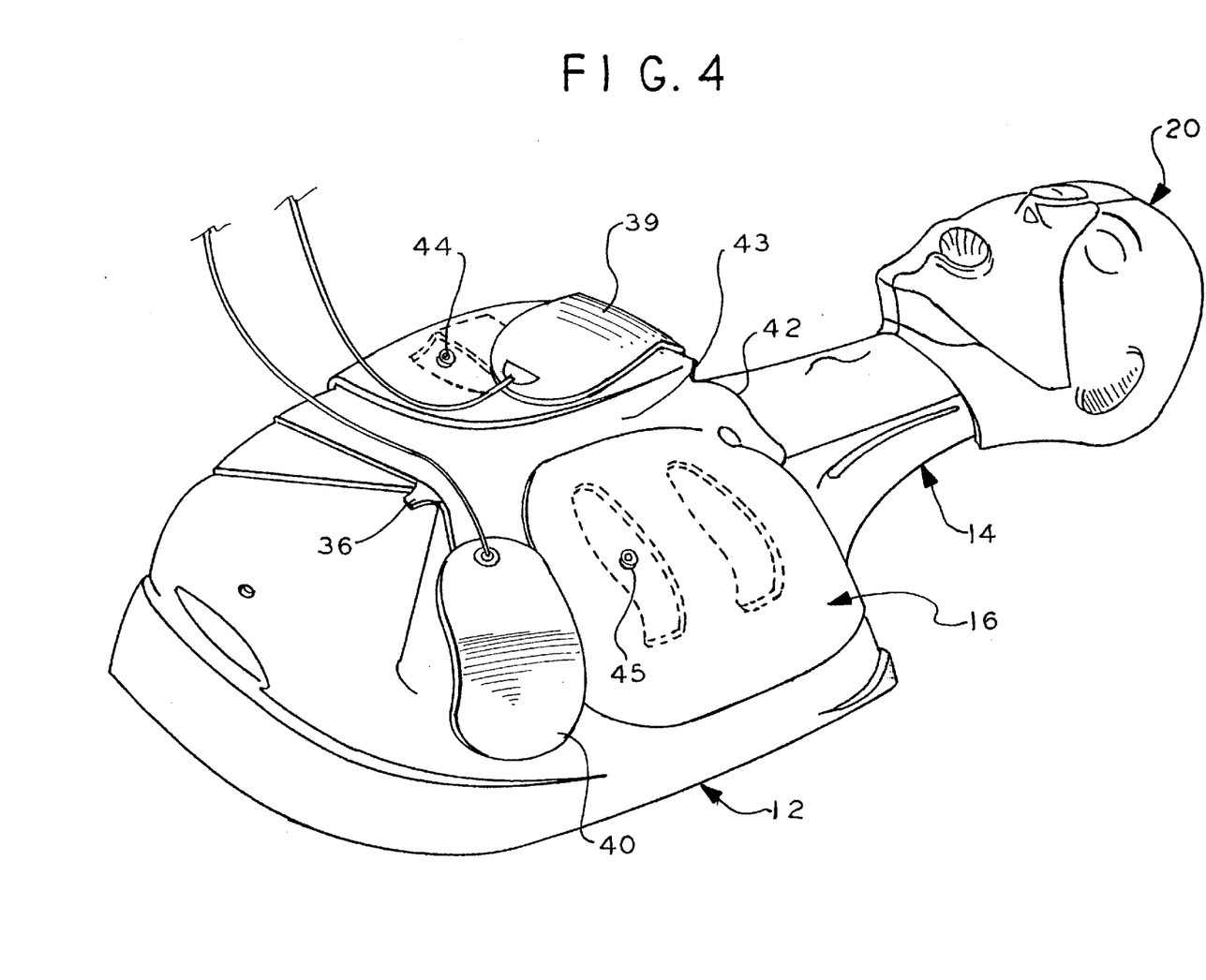
FIG. 4 is a perspective view illustrating the present combination invention including the CPR manikin of the present invention and a plurality of AED electrodes and FIG. 4 illustrates the proper placement of the AED electrodes on the chest plate and chest components comprising the CPR manikin of the present invention.

The chest plate 16, note particularly FIG. 2, is generally substantially planar but has downwardly tapered sides and is complementary in size and shape to, and for engagement with, the torso chest portion 22. The upper portion of the chest plate 16 may be provided with an outwardly extending protrusion 38 simulating the human collar bone. As will be understood from FIGS. 2 and 4, and in accordance with the teachings of the present invention, the overall shape of the chest plate 16 and torso 12 allows for and facilitates the proper placement of AED electrodes, such as electrodes 39 and 40 shown in FIG. 4, on the chest plate and torso. More particularly, the chest plate 16, note FIG. 2, is provided with anatomical landmarks or structural features, namely, the protrusion 42 simulating the human collar bone, a recess or depression 43 simulating the human sternum, and a pair of outwardly extending protrusions 44 and 45 simulating the human nipples, to facilitate proper placement of the AED electrodes 39 and 40 on the chest plate 16 and torso 12 as illustrated in FIG. 4.

The chest plate 16 may be made of a suitable light weight and flexible plastic such as for example polypropylene, and may be made by suitable manufacturing techniques known to the art such as injection molding. If desired, the chest plate 16 may be molded from transparent, or at least substantially transparent, polypropylene so that the ribs 29 and 30 (FIG. 2) remain visible after assembly of the chest plate to the torso. If desired, the underside of the chest plate 14 may be molded to include integrally formed stiffening ribs and the wall thickness of the chest plate 16 may be varied to optimize stiffness and flexibility. During chest compressions, the chest plate 16 flexes in concert with the torso chest portion 22 and provides realistic chest compliance to the teacher and student practicing CPR with the CPR manikin 10.

Figure 5:
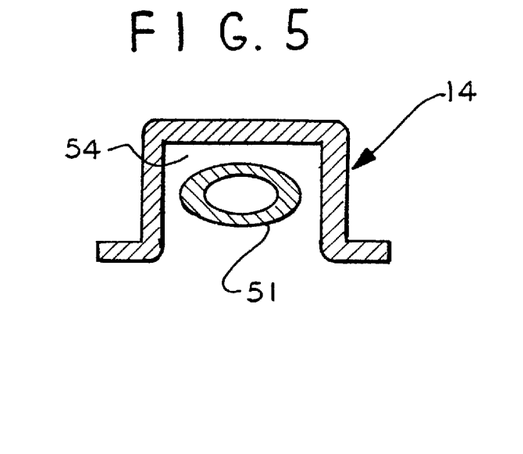
FIG. 5 is a cross-sectional view taken generally along the line 5—5 in FIG. 2 in the direction of the arrows.

The lung 18, FIG. 2, is of hollow, generally flat construction or configuration and may be made, for example, of extruded and blown polyethylene film. The lung 18 includes an enlarged, closed and generally circular end portion 50, a generally elongated intermediate portion 51, shown mostly in dashed outline in FIG. 2, and an open end portion 52. It will be understood from FIG. 2 that the torso chest portion 22 adjacent or integral with the neck 16 is provided with a lung opening 54 through which the lung intermediate portion 51 passes as it extends and resides under the neck 14. As will be understood from FIG. 5, the neck 14 is of a generally inverted U-shaped configuration providing an open channel 54 in which the lung intermediate portion 51 resides. As will be understood from FIG. 2, the generally circular closed end portion 50 of the lung 18 is provided with a transverse seal 58 extending thereacross and sealing the top and bottom layers of the lung together to separate the closed end portion into a bottom end mounting portion 58 through which a mounting hole 56 extends and into an air chamber portion 59 in fluid communication with the intermediate lung intermediate portion 51 and the open lung end portion 52.

Figure 6:
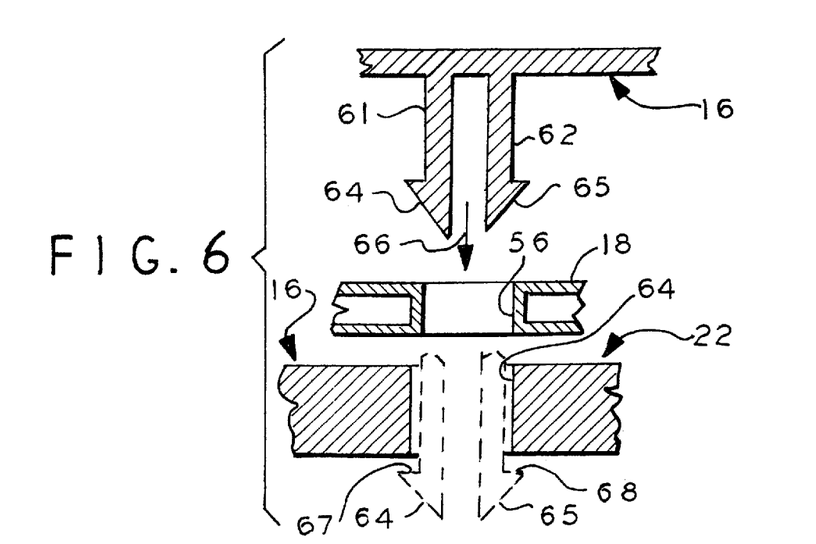
FIG. 6 is an exploded diagrammatical view, in cross-section, illustrating the fastening of the chest plate and lung components to the chest component of the CPR manikin of the present invention using a pair of snap fit members.
Figure 6A:
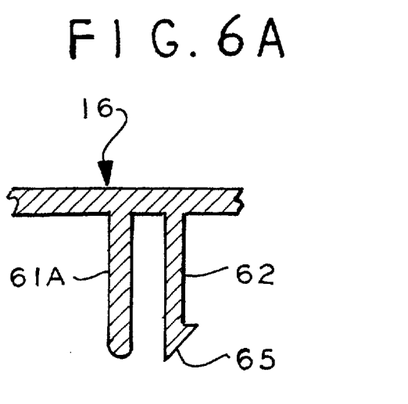
FIG. 6A shows an alternative pair of snap fit members.
Figure 12:
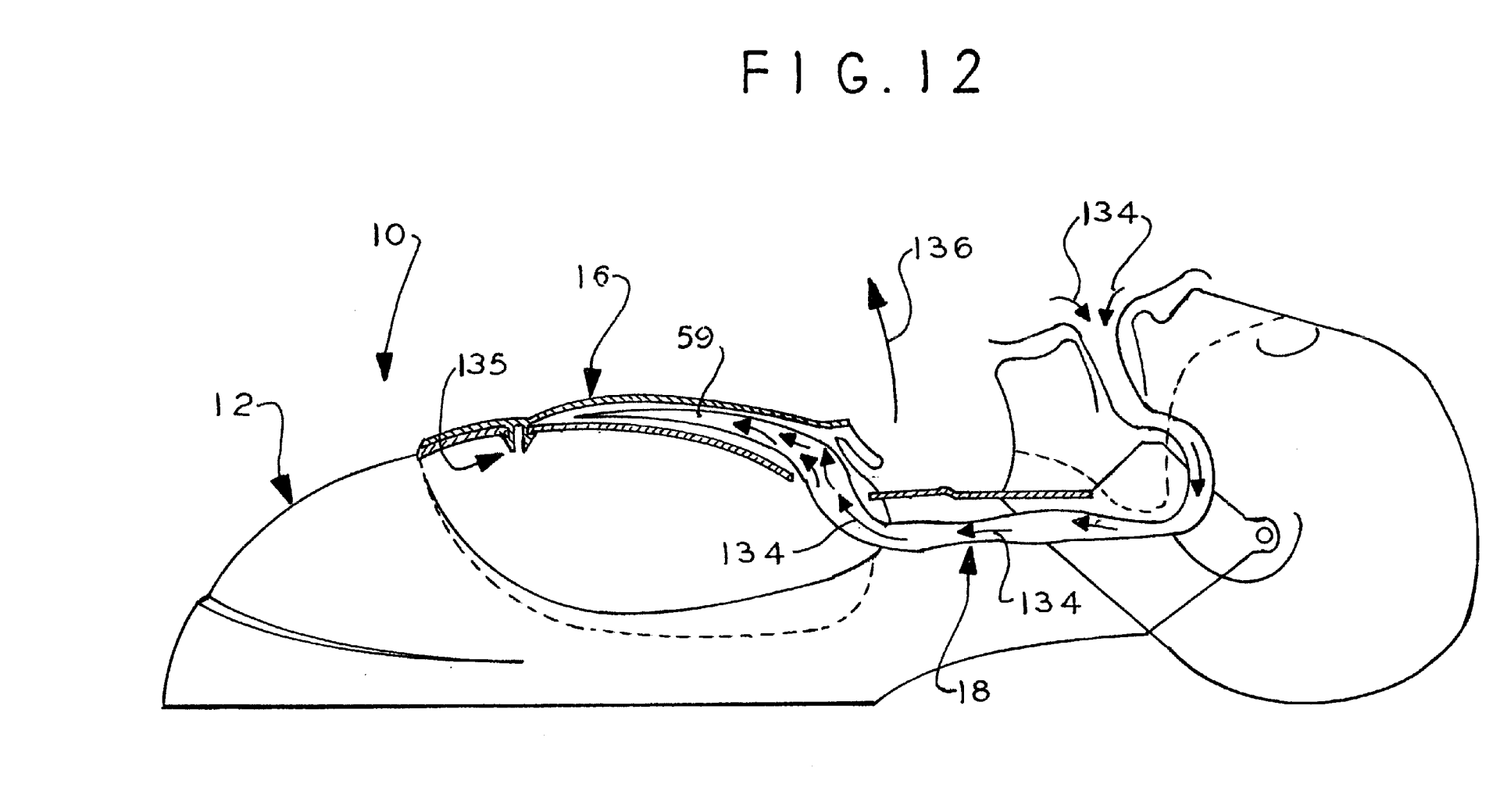
FIG. 12 is a diagrammatical illustration showing the inflation of the lung and the chest rise of the CPR manikin of the present invention.

It will be understood from FIG. 2, and from the irregular shaped diagrammatical opening 57 shown in the chest plate 16, that the underside of the lower portion of the chest plate 16 is provided with a pair of downwardly extending flexible snap fit members 61 and 62; the snap fit members 61 and 62 may be formed integrally with the chest plate 16 or may be formed separately and suitably bonded or adhered thereto using a suitable plastic adhesive. Although not shown in FIG. 2, it will be understood, and as is illustrated diagrammatically in FIG. 6, that the torso chest portion 22 is provided with a mounting hole 64 extending therethrough. It will be understood, and referring to FIG. 6, that the snap fit members 61 and 62 are flexible because they are made of the same flexible material as the chest plate 16 as described above. The snap fit members 61 and 62 are provided with opposed inclined respective camming surfaces 64 and 65 and to assemble or snap fit the chest plate 16 and lung 18 to the torso chest portion 22, the snap fit members 61 and 62 are forced downwardly as indicated downwardly by the arrow 66 in FIG. 6 to extend through the mounting hole 56 formed in the lung 18 and downwardly and into engagement with the portions of the torso chest 22 surrounding the mounting hole 64 to cause the flexible snap members 61 and 62 to flex inwardly permitting them to be forced further downwardly until the camming surfaces 64 and 65 and the latching surfaces 67 and 68 reside underneath the torso chest portion 22 after which the flexible snap members 61 and 62 expand outwardly causing the horizontal latching surfaces 67 and 68 to latch underneath the inner surface of the torso chest portion 22 thereby snap fitting or fastening the chest plate 16 and the lung 18 to the chest portion 22 of the torso 16. The lung 18 and chest plate 16 can be easily and quickly removed from the torso 12 by manually squeezing the camming members 64 and 65, FIG. 6, together and pulling the chest plate 16 and snap fit members 61 and 62 upwardly opposite the direction of the arrow 66. It will be understood that because the snap fit members 61 and 62 are located on the lower portion of the chest plate 16, upon the chest plate 16 and lung 18 being snap fitted to the torso 16 as described above, and upon the air chamber portion 59 of the lung 18 being inflated, as described in detail below, the chest plate 16 will be permitted to rise or move up off the torso 16, as shown in FIG. 12, whereby it will be understood that the snap fit members 61 and 62 mount the chest plate 16, namely the lower portion, pivotally to the torso 12. An alternate pair of snap fit members 61A and 62 are shown in FIG. 6A. Only snap fit member 62 is provided with a camming member, member 65; otherwise the snap fit members 61A and 62 perform the same, or at least substantially the same, function as the snap fit members 61 and 62 of FIG. 6.

Figure 7:
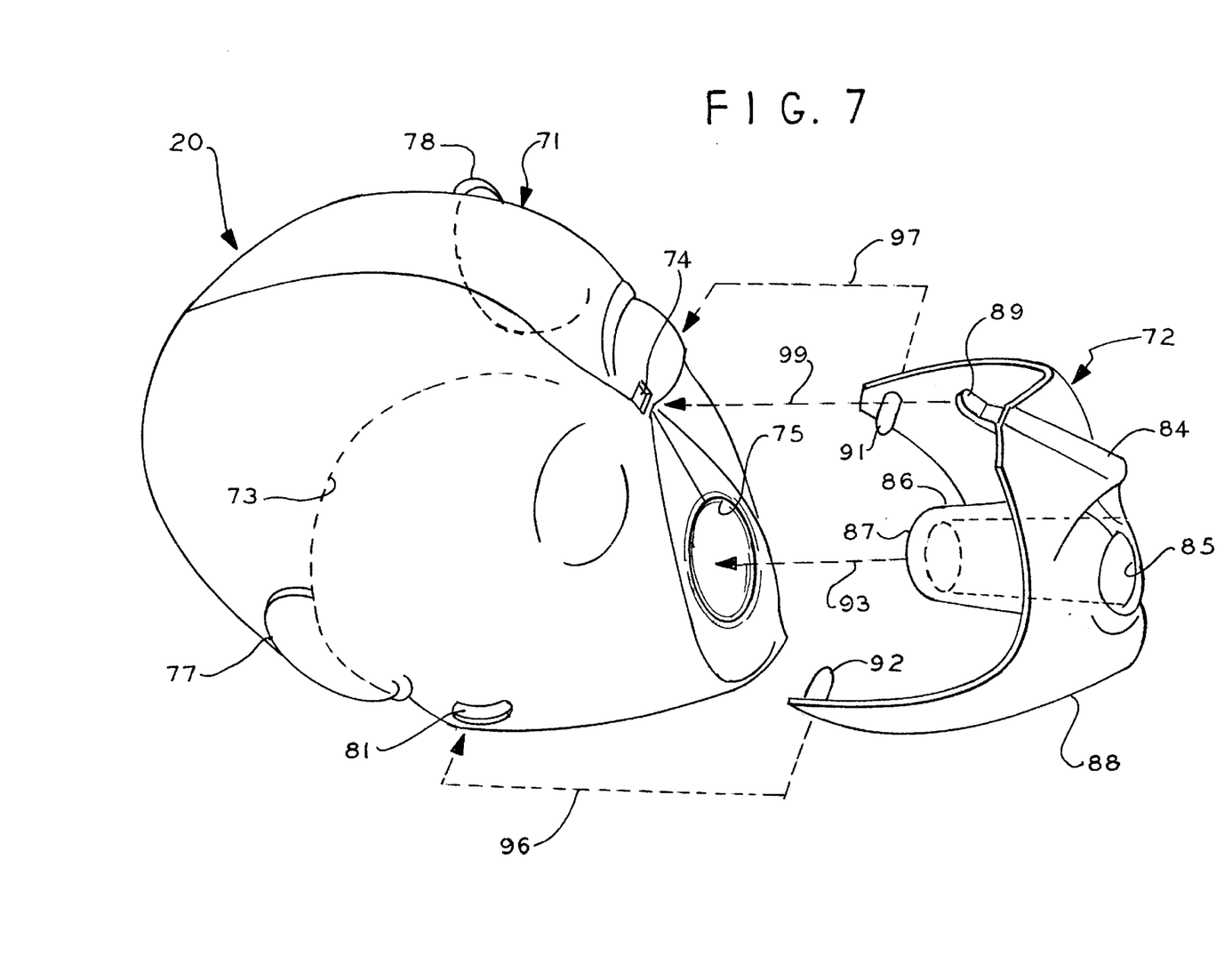
FIG. 7 is an exploded view showing in perspective the two components comprising the head apparatus of the present invention for simulating the human head.

Referring to FIG. 7 and to the head 20, it will be understood that the head 20 includes a hollow first head portion indicated by general numerical designation 71 and a second head portion indicated by general numerical designation 72; the first head portion 71 may be referred to generally as a head member, and the second head portion 72 may be referred to generally as a mouthpiece. The first head portion 71 and the second head portion 72 may be made from a suitable light weight flexible material, such as polypropylene and may be made by a suitable manufacturing techniques, such as injection molding. The first head portion 71 is generally spherical having an open bottom 73 shown in dashed outline in FIG. 7, also note FIG. 2 where the head bottom opening 73 is shown in solid outline, and is provided with a generally rectangular mounting slot 74 in the nose region and a generally circular mouth opening 75. In addition, the head portion 71 is provided with outwardly extending protrusions 77 and 78 simulating the human ears and a pair of generally opposed semi-circular or arcuate mounting slots 81 and 82. Only one arcuate mounting slot 81 is shown in FIG. 7, but it will be understood that a corresponding mounting slot 82 is provided on the opposite side of the head portion 71.

The second head portion, or mouthpiece, 72 may be considered to be a combination nose, mouth and jaw piece member and includes an outwardly extending protrusion simulating the human nose 84, circular opening simulating the human mouth 85 and from which a generally cylindrical hollow or tubular member 86 extends inwardly, a jaw or mandible 88 and an irregularly shaped mounting tab 89 extending outwardly and upwardly from the nose portion 84; the tubular member 86 includes a flat annular surface 87. As shown in FIG. 7, a pair of generally opposed and inwardly extending mouthpiece mounting pins 91 and 92 extend inwardly from the respective right and left jaw portions of the mandible or jaw 88. The head portion 72, or mouthpiece is mounted to the head portion 71, or head member, by being moved or lightly forced into engagement with the head portion 71, as indicated by the dashed arrow 93 in FIG. 7, to insert the irregularly shaped mounting tab 89 provided on the mouthpiece 72 into the rectangular slot 74 provided on the head member 71 and to insert the tubular member 86 through the mouth opening 75 and into the hollow interior of the first head portion 71 and to expand the left and right portions of the jaw or mandible 88 and to cause the mounting pins 91 and 92 provided on the head portion 72 to be received or inserted in the arcuate mounting slots 81 and 82 provided in the head portion 71 as indicated by the dashed line arrows 96 and 97 in FIG. 7. The insertion of the mounting tab 89 provided in the head portion or mouthpiece member 72 into the mounting slot 74 provided on the head portion 17, as indicated by the dashed line arrow 99 in FIG. 7, provides a pivot point 95, indicated diagrammatically in FIG. 11 by numerical designation 98, about which the second head portion 72 pivots with respect to the head portion 71 for sliding arcuate movement with respect thereto, as will be explained in detail below to perform jaw thrusts in practicing CPR.

Referring to FIG. 7, it will be understood that the portion of the second head portion 72 comprising the protrusion and nose 84 may be sufficiently thin-walled that the nose may be squeezed for the pinching of the nostrils in the practice of CPR. Also, it will be understood that upon the second head portion 72 being mounted to the first head portion 71 and the tubular member 87 being inserted into the mouth opening 75, the mouths, or mouth openings, 75 and 85 will be generally aligned.

Figure 8:
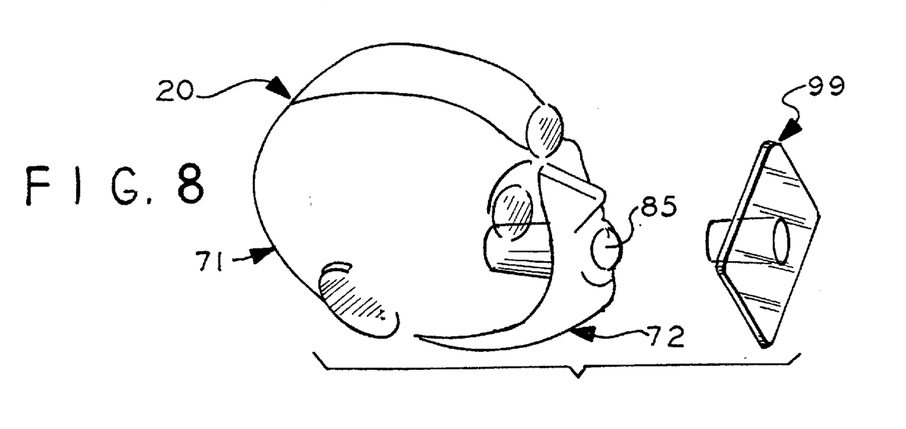
FIG. 8 is a perspective view of the head apparatus of the present invention shown in FIG. 7 and illustrating the manner of use of a protective shield in connection with such head apparatus.

Referring again to FIG. 7 and to FIG. 8, it will be understood that, note FIG. 8, the shape of the mouth opening 18 and tubular member 86 facilitates the insertion of typically used barrier devices, sometimes referred to as face shields, which protect the mouth 85 and the area surrounding the mouth prior to use in CPR training.

Figure 9:
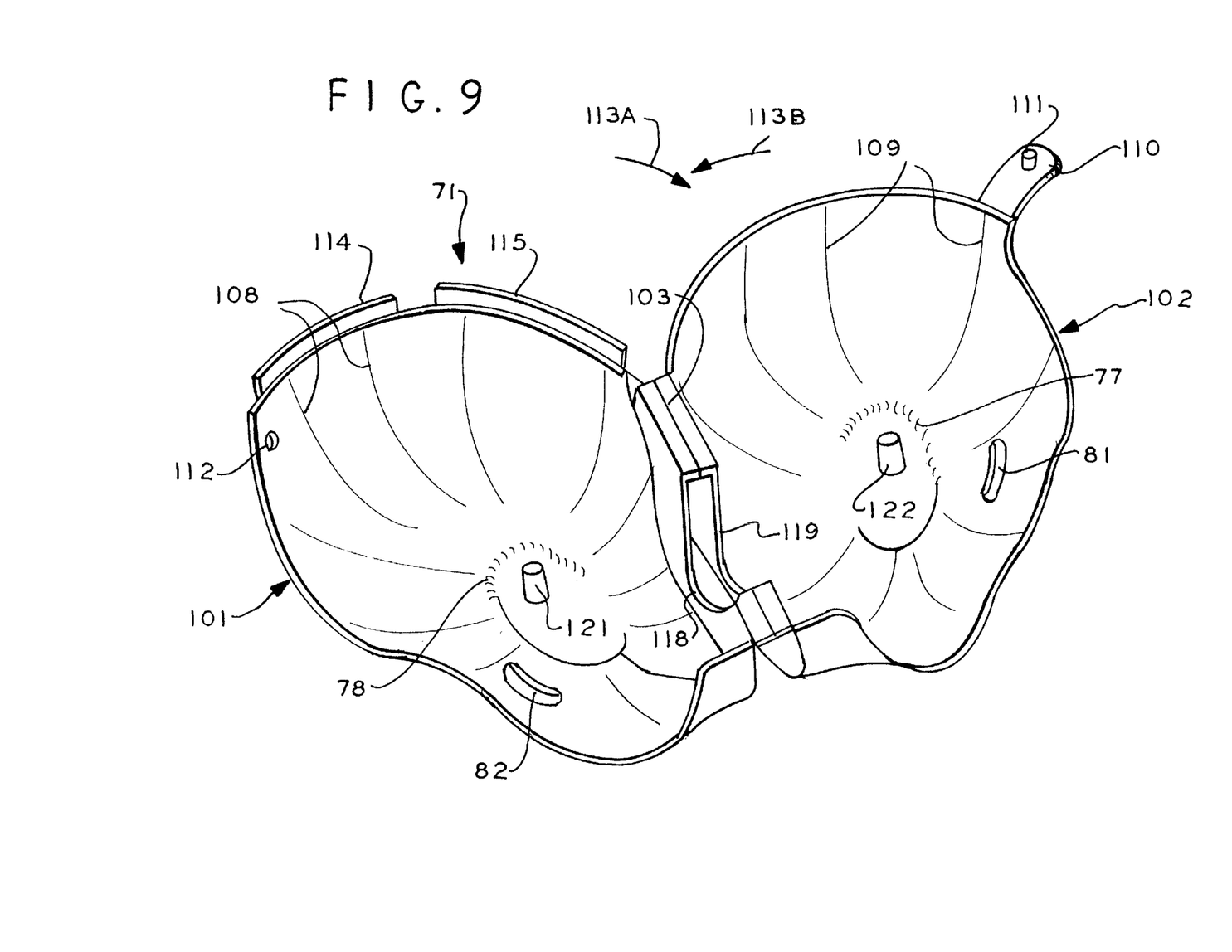
FIG. 9 is a generally plan view of one component of the head apparatus of the present invention and shows this head component unfolded into a generally flat position facilitating the vertical stacking of a plurality of these components to facilitate storage and transportation.

The structure of the first head portion or head member 71 will be understood by reference to FIG. 9. It will be understood that the first head portion or head member 71 is molded, as noted above, in one piece from a suitable light weight and flexible plastic such as, for example, polypropylene, and by a suitable manufacturing process such as injection molding, whereby the head members 101 and 102 are integrally interconnected by a thin portion which is known to the art as a living hinge which, as will be understood from FIG. 1, is situated generally along the head center line 105 residing along the nose 84 and chin 107. The head members 101 and 102, FIG. 9, as will be understood by the respective pluralities of radial lines 108 and 109, are generally outwardly curved head members. Head member 102 is provided with a snap closure member including an outwardly extending tab 110 provided with an inwardly extending connecting pin 111 and the head member 101 is provided with a snap closure connecting hole 112 extending therethrough. The living hinge 103 permits the head members 101 and 102 to be pivoted towards each other about the living hinge, and upon the head members being pivoted together as indicated by the curved arrows 113 and 113B (FIG. 9), the connecting pin 111 is inserted into the connecting hole 112 to cause the head members 101 and 102 to be secured together and to cooperatively form a hollow generally spherical member comprising the first head portion or first head member 71; the snap closure between the connecting pin 111 and connecting hole 112 prevents the head members 101 and 102 from separating during CPR practice. The head member 101, FIG. 9, may be provided with a pair of integrally formed and outwardly extending projections or flanges 114 and 115 which, upon the head members 101 and 102 being secured together, will overlie portions of the head member 102 to further facilitate the closure of the head members upon each other with the flanges 114 and 115 residing over adjacent portions of the head member 102.

Figure 10:
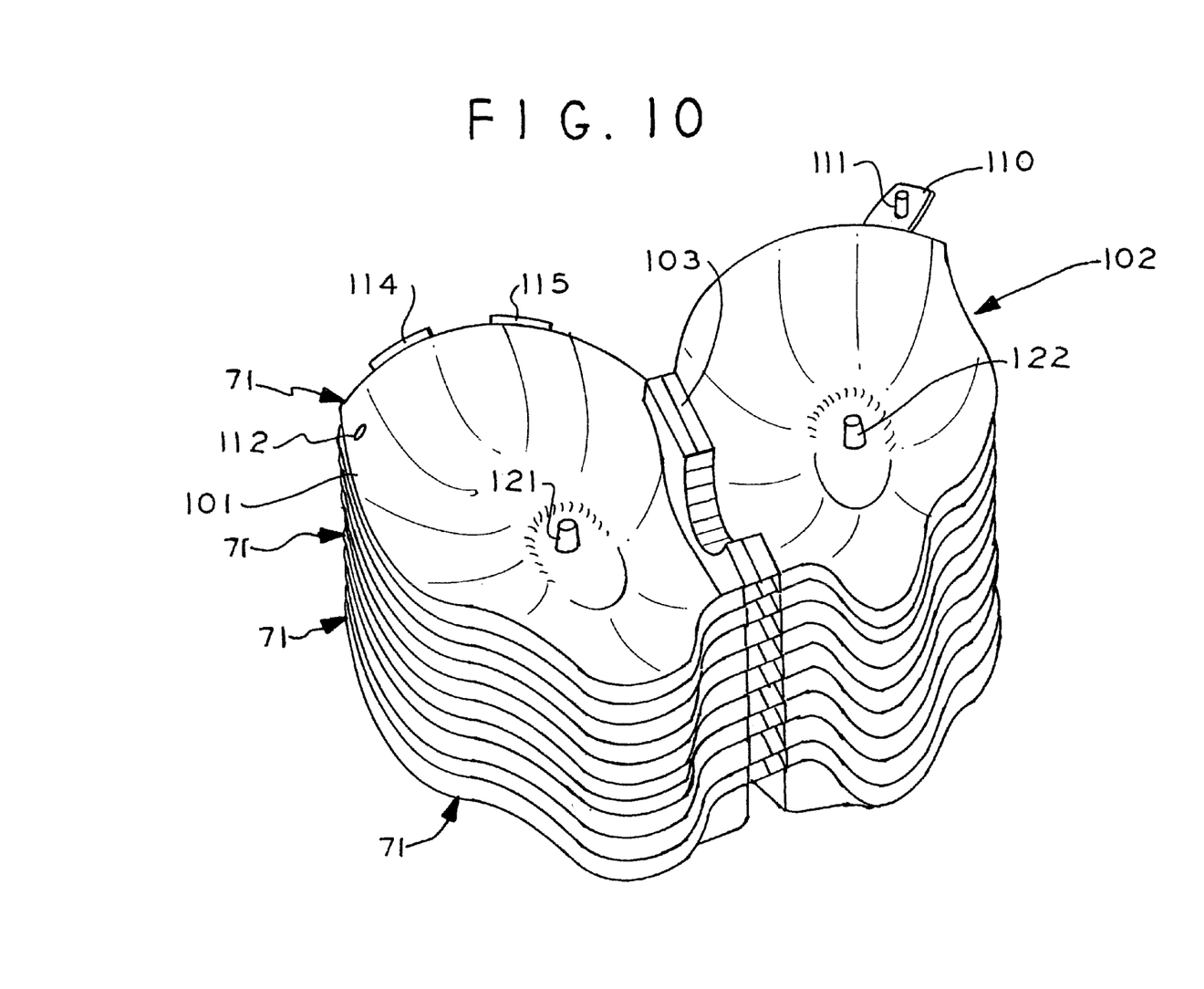
FIG. 10 illustrates a plurality of the head components shown in FIG. 9 stacked or nested in a vertical stack to facilitate storage and transportation.

Referring further to FIG. 9, the head members 101 and 102 are provided, respectively, with inwardly extending generally half circle openings 118 and 119 which, upon the head members 101 and 102 being connected or secured together, cooperatively provide the mouth opening 75 shown in FIG. 7. After the practice of CPR, the second head portion or mouth member 72, FIG. 7, may be removed or dismounted from the first head member portion 20 by reversing the mounting procedure described above and, FIG. 9, namely, the snap closure between the head member portions 101 and 102 may be undone by removing the connecting pin 111 from the connecting hole 112 after which the head members 101 and 102 are folded away from each other, opposite the directions of the arrows 113A and 113B, to occupy the position shown in FIG. 9. This provides easy access to the interior of the first head portion 71 and permits easy cleaning of such interior. Referring to FIG. 10, upon the head members 101 and 102 of the first head portion being pivoted away from each other about the living hinge 103, the first head portion becomes substantially flat or planar, and a plurality of first head portions 71 may be stacked together vertically for efficient storage and transportation to a CPR training site. Alternative to the living hinge 103, FIG. 10, the head members 101 and 102 may be molded in two parts and provided with suitable mechanical closures or snap-fitting to mount the head members together for pivotal movement with respect to each other.

The head 20, FIGS. 1 and 2, is mounted pivotally on the neck means 14 to perform the head tilt in the practice of CPR. More particularly, the pivotal interconnection between the first head portion or head member 71, note FIG. 9, and the neck 14, note FIG. 2, is provided by a pair of inwardly extending head mounting pins 121 and 122 (FIG. 9) extending inwardly generally from the ear protrusions 77 and 78, and a clevis portion indicated by general numerical designation 124 (FIG. 2) which clevis portion 124 is provided with a pair of spaced apart and opposed head mounting holes 126 and 127. The head mounting pins 121 and 122 (FIG. 9) are for being inserted into the head mounting holes 126 and 127 as indicated in FIG. 2 by the dashed line arrows 131 and 132.

Figure 11:
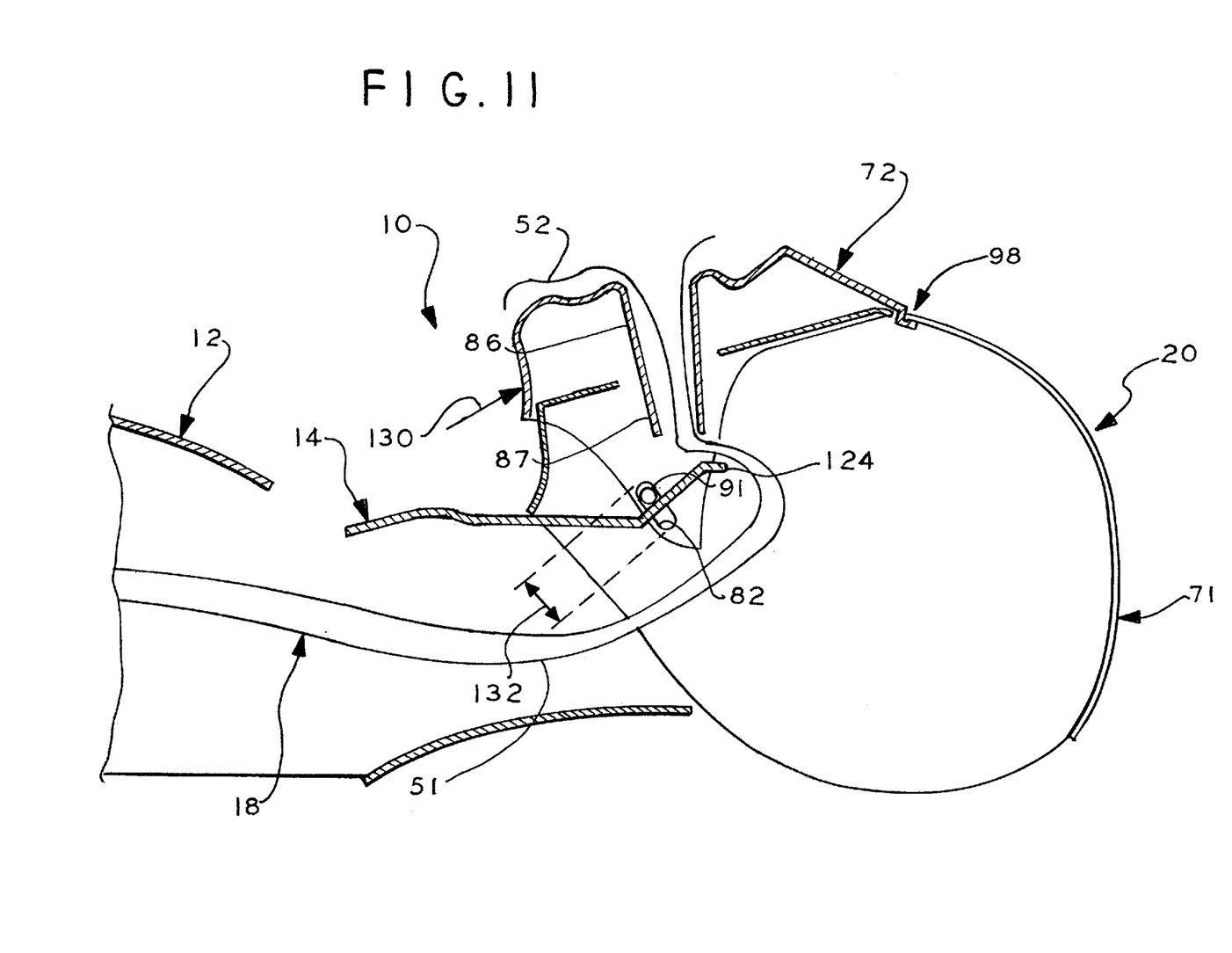
FIG. 11 is a diagrammatical illustration of the manner in which the head apparatus of the present invention may be utilized to perform jaw thrusts in the practice of CPR.

Referring now to FIG. 11, and unlike as shown in FIG. 1, in the normal position, the second head portion 72 is pivoted toward the first head portion 71 with the flat circular end 87 of the tubular member 86 compressing the intermediate portion 51 of the lung 18 against the clevis portion 124 of the neck 14 to close the lung and prevent air, such as blown from the mouth of a teacher or student during ventilation in the practice of CPR, from entering the lung 18. To practice jaw thrusts, or the jaw thrust maneuver used in the practice of CPR, a generally upward force, indicated by the arrow 130 in FIG. 11, is applied manually to the second head portion 72, by the CPR teacher or student, to pivot the second head portion 72 about the above-described pivot point 98 and to cause the second head portion 72 to pivot slidably and arcuately with respect to the first head portion 71 which movement is allowed or permitted by the sliding arcuate movement of the connecting pins 91 and 92 (FIG. 7) in the respective arcuate slots 82 and 83 (FIG. 9), only connecting pin 91 and arcuate slot 92 being shown in FIG. 11. Such arcuate sliding pivotal movement of the second head portion 72 with respect to the first head portion 71 is limited by the arcuate length of the arcuate slots, e.g. arcuate slot 82, which arcuate length is indicated diagrammatically in FIG. 11 by the double headed arrow 132. Simultaneously, or contemporaneously, the head 20, in the practice of CPR, is rotated about the neck 14 (FIG. 12) in the manner described above to perform head tilt. This sliding arcuate pivoting movement of the second head portion 72 with respect to the first head portion 71 moves the flat annular end 87 of the tubular member 86 away from the clevis portion 124 of the neck 14 thereby opening the intermediate portion 51 of the lung to permit ventilation of the manikin 10 in the practice of CPR. More particularly, such opening of the intermediate portion 51 of the lungs 18 permits the teacher or student to now blow air from his/her lungs into the lung mouthpiece 52 which air will flow through the intermediate portion of the lung 18 and into the lungs air compartment portion 59 (FIG. 2). Flow of the air into the lungs 18 is illustrated diagrammatically in FIG. 12 by the plurality of arrows 134. The normal position of the chest plate 16 is shown in dashed outline in FIG. 12, but upon the lungs 18 being ventilated, as described above by air being blown into the lungs 18 from the lungs of a CPR teacher or student, the air compartment portion 59 (also note FIG. 2) is inflated causing the chest plate 16 to pivot with respect to the torso 12 about the snap fit connection indicated diagrammatically in FIG. 12 by arrow 135, provided by the snap fit members 61 and 62 shown in FIG. 2 and described above, to cause the chest plate 16 to rise off of the torso chest portion 22 (FIG. 2) as indicated by the curved arrow 136 in FIG. 12. It will be further understood that the snap fit connection 135 causes the chest plate 16 to rise from the torso chest portion with sufficient resistance to provide realistic feedback to the student or teacher using the manikin 10 to practice CPR.

It will be further understood that the snap fit connection 135 and the flexible brilliant material of which the chest plate 16 is made, e.g. the above-noted polypropylene, causes the chest plate 16 to flex back into engagement with the torso chest portion 22 upon the cessation of air into the lungs 18 and the deflation of the lungs; this provides further realistic feedback to the teacher or patient practicing CPR on the manikin 10.

It will be understood that since both the torso 12 and chest plate 16 are made of flexible and resilient plastic, such as the above-noted polypropylene, the chest plate and torso 16 compress in concert during the performance of chest compressions in the practice of CPR thereby providing realistic chest compliance.

Figure 13:
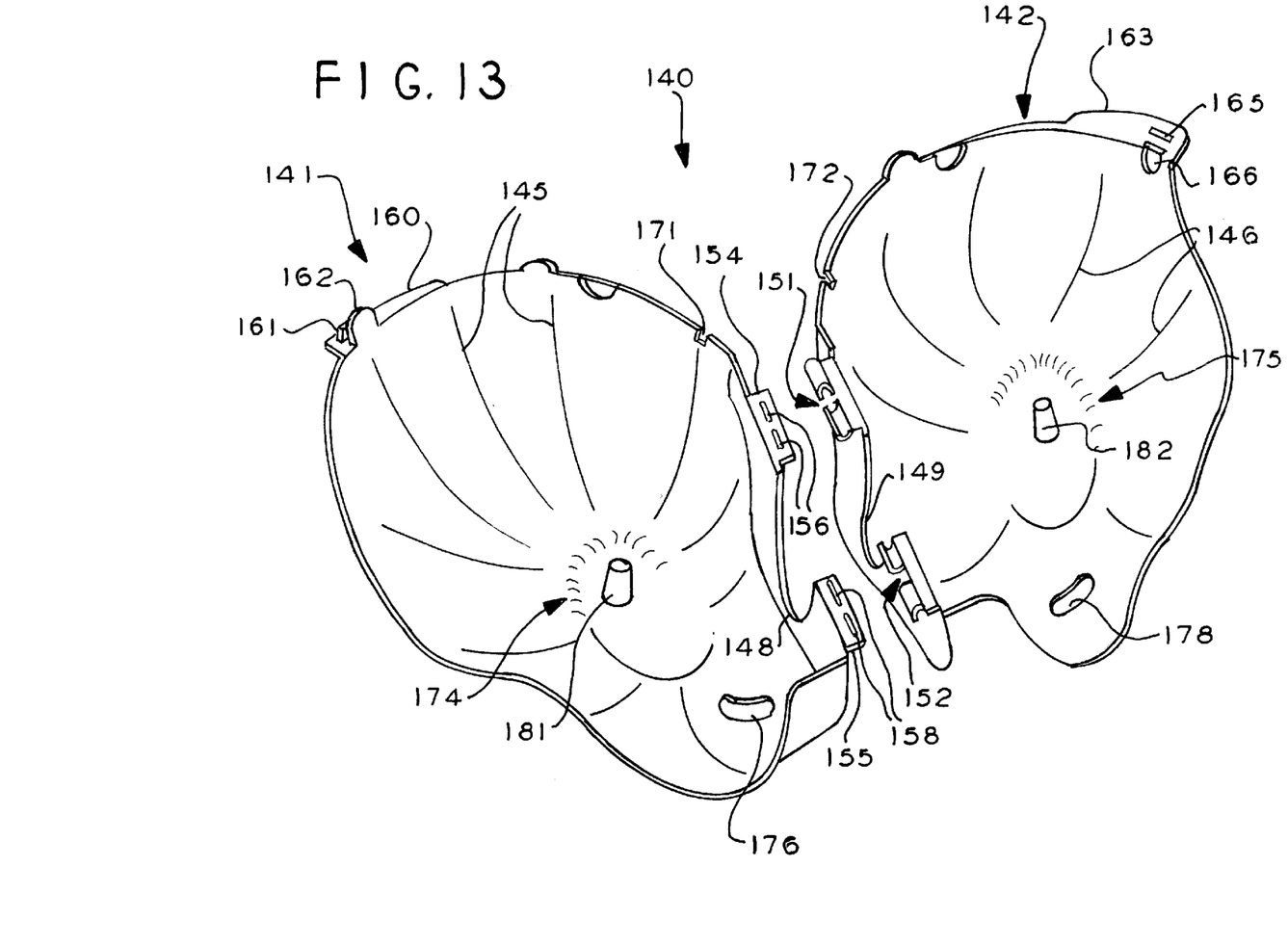
FIG. 13 is a generally plan view of an alternate embodiment of one component of the head apparatus of the present invention and shows this head component generally flat and with the two structural elements comprising this component shown separated for clarity of presentation.

An alternate embodiment of the first head portion or head member is shown in FIG. 13 and indicated by general numerical reference designation 140; first head member 140 is an alternate embodiment to the first head member shown in FIGS. 7 and 9 and described above. As shown in FIG. 13, the first head portion or head member 140 includes a pair of individual or physically separate generally outwardly curved head members indicated respectively by general numerical designations 141 and 142. Outwardly curved head members 141 and 142 each may be molded separately in one piece from a suitable light weight and flexible plastic such as, for example, polypropylene, and by a suitable manufacturing process such as injection molding. The head members 141 and 142, as noted generally above, are generally outwardly curved head members as will be understood more particularly by the respective pluralities of radial lines 145 and 146 shown in FIG. 13, which lines 145 and 146 are similar to the lines 108 and 109 shown in FIG. 9. It will be generally understood that the two outwardly curved head members 141 and 142 of FIG. 13 upon being hinged together, and snap-fitted together, as described in detail below, form a hollow generally spherical member comprising an alternate embodiment to the first head portion or head member 71 shown in FIG. 7, and it will be further understood that the second head member 72 shown in FIG. 7 is for being mounted to the alternate embodiment head portion 140 for sliding arcuate movement with respect thereto as explained in detail above with regard to the head member 171 to perform jaw thrusts in practicing CPR.

Referring again to FIG. 13, the outwardly curved head members 141 and 142 are provided, respectively, with inwardly extending generally half circle openings 148 and 149 which, upon the head members 141 and 142 being hinged and snap-fitted together as described in detail below, form a mouth opening such as mouth opening 75 shown in FIG. 7.

Head member 142, FIG. 13, is provided with first and second pairs of curved and outwardly extending hinge members indicated by general numerical designations 151 and 152, and the head member 141 is provided with outwardly extending hinge members 154 and 155 provided with respective pairs of openings 156 and 158 for receiving, respectively, the pairs of curved and outwardly extending hinge members 151 and 153 provided on the head member 142. Upon the curved and outwardly extending hinge members 151 and 152 being received within the openings 156 and 158, such hinge members and openings cooperatively provide a hinge about which the outwardly curved head members 141 and 142 pivot together to form the above-noted hollow generally spherical head member comprising an alternate embodiment to the first head member 71 shown in FIG. 7. It will be noted from FIG. 13 that alternate adjacent ones of the pairs of curved and outwardly extending hinge members 151 and 152 provided on the head member 142 are curved in opposite directions and it has been found that such opposite curvature provides an improved hinge with enhanced pivoting action.

Head member 141 includes a tab 160, FIG. 13, provided with a plurality of outwardly extending snap-fit members 161 and 162 and head member 142 is provided with a tab 163 provided with a pair of snap openings 165 and 166 for respectively receiving the snap fit members 161 and 162 in a slight interference fit to snap-fit the head members 141 and 142 together after being pivoted into engagement with each other about the cooperative hinge means as described above.

As will be further understood from FIG. 13, the outwardly curved head members 141 and 142 are provided, respectively, with inwardly extending generally rectangular slots 171 and 172 which cooperatively provide a generally rectangular opening upon the outwardly curved head members 141 and 142 being pivoted and snap-fitted together as described above. The rectangular opening provided cooperatively by the slots 171 and 172 is for receiving the irregularly shaped mounting tab 89, FIG. 7, provided on the second head portion 72 for the same purpose described above with regard to the mounting of the second head portion 72 to the first head portion 71 and as illustrated diagrammatically in FIG. 7.

Referring further to FIG. 13 and to the alternate embodiment first head portion or head member 140, the outwardly curved head members 141 and 142 are provided respectively, on their reverse sides, with outwardly extending protrusions 174 and 175, indicated respectively by general numerical designations 174 and 175, simulating the human ears and with a pair of arcuate mounting slots 176 and 178. The outwardly extending protrusions 174 and 175 are indicated in FIG. 13 by the pluralities of curved lines as shown and simulate the human ears in the same manner as the protrusions 78 and 77 as shown in FIG. 9. As is further shown in FIG. 13, a pair of inwardly extending head mounting pins 181 and 182 extend inwardly generally from the ear protrusions 174 and 175. It will be further understood that upon the outwardly curved head members 141 and 142 being pivoted and snap-fitted together to provide the alternate embodiment first head portion or head member 140, the second head member or head portion 72 shown in FIG. 7 is mounted to the alternate embodiment head member 140 in the same manner that the second head member 72 is mounted to the first head member 71 as illustrated diagrammatically in FIG. 7 and for the same purpose of providing CPR jaw thrust movement. Lastly, it will be understood that the alternate embodiment first head portion or head member 140 (FIG. 13) is mounted pivotally to the clevis portion 124 of the neck 14 (FIG. 2) by the mounting pins 181 and 182 (FIG. 13) which are received within the mounting holes 126 and 127 provided in the neck clevis portion 124 (FIG. 2). This pivotal head mounting permits the practice of the above-noted CPR head tilt movement.

It will be understood by those skilled in the art that many variations and modifications may be made in the present invention without departing from the spirit and the scope thereof.

What is claimed is:

1. Apparatus for practicing cardiopulmonary resuscitation (CPR) comprising torso means, breast plate means, lung means and hollow head means including mouth means, said breast plate means mounted pivotally to said torso means, said lung means residing intermediate said torso means and said breast plate means and mounted to said torso means and extending into said hollow head means and out said mouth means, said head means including first head means and second head means mounted to said first head means for sliding arcuate movement with respect thereto to perform jaw thrusts in the practice of CPR.

2. Apparatus for practicing cardiopulmonary resuscitation (CPR) comprising torso means including neck means, breast plate means, elongated lung means including a closed end portion separated into a lung mounting portion and an air compartment portion and an open end portion for admitting air into said lung means to inflate said air compartment portion, and hollow head means including mouth means, said lung mounting portion mounted to said torso and said breast plate means mounted pivotally to said torso means through said, lung mounting portion and for pivotal movement with respect to said torso means in response to inflation of said air compartment portion to indicate chest rise in the practice of cardiopulmonary resuscitation, said open end portion of said lung means extending into said hollow head means and out said mouth means, said head means including a first head member portion and a second head member portion mounted to said first head member portion for sliding arcuate movement with respect thereto to perform jaw thrusts in the practice of CPR; and said head means mounted pivotally to said neck means to perform head tilt in the practice of CPR.

3. The apparatus according to claim 2 wherein said lung means includes an intermediate portion intermediate said closed end portion and said open end portion, wherein said neck means provides an inverted U-shaped channel, wherein said head means has an open bottom, wherein said torso means are hollow and are provided with a lung opening adjacent said neck means, and wherein said intermediate portion of said lung means extends inwardly of said torso means through said lung opening and through said inverted U-shaped channel and through said open bottom of said head means and into said hollow head means.

4. The apparatus according to claim 3 wherein said torso means are hollow, include a chest portion adjacent said neck means and an abdominal portion opposite said neck means and wherein said abdominal portion is provided with an abdominal opening to enhance compression and flexing of said abdominal portion to perform abdominal thrusts in the practice of CPR, wherein said chest portion is provided with pluralities of openings defining solid portions therebetween simulating human ribs and wherein said lung opening is provided in said chest portion proximal said neck means.

5. Apparatus for practicing cardiopulmonary resuscitation (CPR) comprising:

torso means;

neck means mounted to said torso means;

chest plate means;

head means including first head means and second head means, said first head means being substantially hollow, having an open bottom and a first mouth opening, said second head means including a jaw and having a second mouth opening, said second head means for being mounted pivotally to said first head means and for sliding arcuate movement with respect thereto to teach jaw thrusts in practicing CPR, said second mouth opening including an inwardly extending hollow cylindrical tube for being inserted through said first mouth opening and into said first head means to substantially align said first mouth opening and said second mouth opening;

lung means including a closed end portion, an open end portion, and an intermediate portion, said closed end portion for residing between said torso means and said chest plate means, said intermediate portion for extending along said neck means and through said open bottom of said first head means and through said tubular means and said closed end portion for extending outwardly of and residing outwardly of said second mouth opening; and said torso means, said chest plate means and said lung means provided with cooperative first mounting means for mounting said chest plate means and said lung means to said torso means and for mounting said chest plate means pivotally with respect to said torso means; and second mounting means for mounting said head means pivotally to said neck means.

6. The apparatus according to claim 5 wherein said torso means are substantially a single half shell with tapered sides having a completely open bottom and being made of flexible material and being provided with pluralities of generally opposed openings simulating ribs therebetween, and provided with a neck opening proximal said neck means through which said intermediate portion of said lung extends.

7. The apparatus according to claim 6 wherein said half shell includes a chest portion proximal said neck means and being provided with said opposed openings, and said chest portion including an abdominal portion provided with an abdominal opening generally opposite said neck opening, said abdominal opening facilitating compression and flexing of said abdominal portion to perform abdominal thrusts in practicing CPR.

8. The apparatus according to claim 5 wherein said torso means generally comprise a generally semi-spherical hollow dome having a completely open bottom and including a chest portion provided with a neck opening proximal said neck means and an abdominal portion provided with an abdominal opening generally opposite said neck opening, said neck opening permitting said intermediate portion of said lung to extend therethrough and said abdominal opening facilitating compression and flexing of said abdominal portion to perform abdominal thrusts in practicing CPR.

9. The apparatus according to claim 5 wherein said chest plate means are generally complementary in shape to said torso.

10. The apparatus according to claim 5 wherein said first mounting means includes snap fit means extending outwardly from said chest plate means, a first mounting hole provided in said closed end portion of said lung means and a second mounting hole provided in said half shell.

11. The apparatus according to claim 10 wherein said snap fit means comprise a pair of spaced apart, opposed, flexible snap fit members at least one of which includes an angularly extending camming portion, upon said snap fit members being extended through said first mounting hole and extended through said second mounting hole said camming member forcing said snap fit means together and upon said camming member extending through said second mounting hole said camming member extending outwardly to snap fit said chest plate means and said closed end portion of said lung means to said chest portion of said half shell and to mount said chest plate means pivotally to said half shell.

12. The apparatus according to claim 8 wherein said neck opening permits said intermediate portion of said lung means to extend therethrough and to reside under said neck means.

13. The apparatus according to claim 5 wherein said chest plate means is provided with an outwardly extending protrusion simulating the human collar bone.

14. The apparatus according to claim 5 wherein said neck means are provided with an upwardly extending protrusion simulating the human Adam's apple.

15. The apparatus according to claim 7 wherein said chest portion of said half shell is provided with a generally upwardly and outwardly extending trapezoidal shaped protrusion simulating the xiphoid process of the human sternum.

16. The apparatus according to claim 5 wherein said neck means extend generally longitudinally and include opposed side portions provided with inwardly extending grooves simulating the human carotid arteries.

17. The apparatus according to claim 8 wherein said intermediate portion of said lung means extend through said neck opening and wherein said neck means extend generally longitudinally and are generally inverted, U-shaped in transverse cross-section to provide an open channel through which at least a portion of said intermediate portion of said lung means extends so as to reside generally under said neck means.

18. The apparatus according to claim 5 wherein said first head means are hollow and generally spherical and are provided with a pair of generally opposed outwardly extending ear portions and a pair of generally opposed inwardly extending head mounting pins extending generally inwardly from said opposed ear portions, wherein said neck means includes an outer end portion provided with a clevis portion providing a pair of generally opposed head mounting holes and wherein said head mounting pins are for being received within said head mounting holes to mount said first head means pivotally with respect to said neck means to permit said head means to be rotated with respect to said neck means to simulate head tilt in the practice of CPR, said head mounting pins and said head mounting holes comprising said second mounting means.

19. The apparatus according to claim 5 wherein said first head means are provided with a tab mounting opening and a pair of spaced apart and generally opposed arcuate slots and wherein said second head means are provided with an outwardly extending and irregularly shaped mounting tab for being received within said tab mounting opening to provide a pivot point and a pair of generally opposed and inwardly extending mounting pins for being received slidably within said arcuate slots to permit said second head means to pivot about said pivot point and with respect to said first head means and to permit said mounting pins to slide arcuately in said arcuate slots to provide said sliding arcuate movement of said second head means with respect to said first head means.

20. The apparatus according to claim 5 wherein said second head means includes a nose portion, a mouth portion providing said second mouth opening, and a jaw portion, said nose portion being a thin-walled portion permitting the nose portion to be squeezed to practice closing of the nostrils in the practice of CPR.

21. The apparatus according to claim 5 wherein said first head means are formed from a generally clam shell configuration including a pair of outwardly curved head members interconnected by an integrally formed hinge, each of said curved members provided with an inwardly extending generally half a circle opening, one of said head members provided with an outwardly extending tab provided with an inwardly extending connecting pin and the other of said head members provided with a connecting hole extending therethrough and upon said head members being pivoted toward each other about said hinge and said connecting pin being inserted through said connecting hole said head members closing together and forming a hollow generally spherical member comprising said first head means and said half circle openings meeting to form said first mouth opening, upon said connecting pin being removed from said connecting hole and said head members pivoted away from each other about said hinge said pair of head members being generally flat to permit a plurality of said first head means to be stacked vertically.

22. The apparatus according to claim 5 wherein said first head means comprise a pair of individual outwardly curved head members, each of said curved head members provided with an inwardly extending generally half circle opening, said curved head members provided with cooperative hinge means about which said curved head members pivot to form a hollow generally spherical member comprising said first head means, and to cause said half circle openings to meet and form said first mouth opening, said curved head members further provided with cooperative snap fit means for snap fitting said curved head members together, upon said cooperative snap fit means being unsnapped and upon said curved head members being pivoted away from each other about said cooperative hinge means, said pair of curved head members being generally flat to permit a plurality of said first head means to be stacked vertically.

23. The apparatus according to claim 22 wherein said cooperative hinge means comprise a plurality of curved and outwardly extending first hinge members provided on one of said curved head members and a plurality of outwardly extending second hinge members provided on the other of said curved head members, said second hinge members provided with openings for receiving said first hinge members.

24. The apparatus according to claim 23 wherein alternate adjacent ones of said first hinge members are curved in opposite directions.

25. The apparatus according to claim 22 wherein said cooperative hinge means comprise first cooperative hinge means and second cooperative hinge means, wherein said first cooperative hinge means are disposed on one side of said first mouth opening and said second cooperative hinge means are disposed on the other side of said first mouth opening.

26. The apparatus according to claim 22 wherein said cooperative snap-fit means comprise a plurality of outwardly extending snap-fit members provided on one of said head members and a plurality of snap-fit openings provided on the other of said head members for receiving said plurality of outwardly extending snap fit members.

27. The apparatus according to claim 5 wherein said apparatus are also for practicing automatic external defibrillation (AED), and wherein said apparatus further comprises a plurality of AED electrodes, and wherein at least said chest plate means are provided with anatomical landmarks to facilitate the proper placement of said AED electrodes on said apparatus and wherein said anatomical landmarks comprise a protrusion provided on said chest plate means simulating the human collar bone, an indentation provided on said chest plate means simulating the human sternum, and a pair of outwardly extending protrusions provided on said breast plate means simulating the human nipples, and wherein said AED electrodes are provided with an adhesive to adhere said electrodes to said chest plate means and said torso means.

28. Apparatus for simulating the human head, comprising:
head means including first head means and second head means, said first head means being substantially hollow, having an open bottom and a first mouth opening, said second head means including a jaw and having a second mouth opening, said second head means for being mounted pivotally to said first head means and for sliding arcuate movement with respect thereto, said second mouth opening including an inwardly extending hollow cylindrical tube for being inserted through said first mouth opening and into said first head means to substantially align said first mouth opening and said second mouth opening.

29. The apparatus according to claim 28 wherein said first head means are provided with a tab mounting opening and a pair of spaced apart and generally opposed arcuate slots and wherein said second head means are provided with an outwardly extending and irregularly shaped mounting tab for being received within said tab mounting opening to provide a pivot point and a pair of generally opposed and inwardly extending mounting pins for being received slidably within said arcuate slots to permit said second head means to pivot about said pivot point and with respect to said first head means and to permit said mounting pins to slide arcuately in said arcuate slots to provide said sliding arcuate movement of said second head means with respect to said first head means.

30. The apparatus according to claim 28 wherein said second head means includes a nose portion, a mouth portion providing said second mouth opening, and a jaw portion, said nose portion being a thin-walled nose portion.

31. The apparatus according to claim 28 wherein said first head means are formed from a generally clam shell configuration including a pair of outwardly curved head members interconnected by an integrally formed hinge, each of said curved head members provided with an inwardly extending generally half circle opening, one of said head members provided with an outwardly extending tab provided with an inwardly extending connecting pin and the other of said head members provided with a connecting hole extending therethrough and upon said head members being pivoted toward each other about said hinge and said connecting pin being inserted through said connecting hole said head members closing together and forming a hollow generally spherical member comprising said first head means and said half circle openings meeting to form said first mouth opening, upon said connecting pin being removed from said connecting hole and said curved head members pivoted away from each other about said hinge said pair of curved head members being generally flat to permit a plurality of said first head means to be stacked vertically.

32. The apparatus according to claim 28 wherein said first head means comprise a pair of individual outwardly curved head members, each of said curved head members provided with an inwardly extending generally half circle opening, said curved head members provided with cooperative hinge means about which said curved head members pivot to form a hollow generally spherical member comprising said first head means, and to cause said half circle openings to meet and form said first mouth opening, said curved head members further provided with cooperative snap fit means for snap fitting said curved head members together, upon said cooperative snap fit means being unsnapped and upon said curved head members being pivoted away from each other about said cooperative hinge means, said pair of curved head members being generally flat to permit a plurality of said first head means to be stacked vertically.

33. The apparatus according to claim 32 wherein said cooperative hinge means comprise a plurality of curved and outwardly extending first hinge members provided on one of said curved head members and a plurality of outwardly extending second hinge members provided on the other of said curved head members, said second hinge members provided with a plurality of openings for receiving said first hinge members.

34. The apparatus according to claim 33 wherein alternate adjacent ones of said first hinge members are curved in opposite directions.

35. The apparatus according to claim 32 wherein said cooperative hinge means comprise first cooperative hinge means and second cooperative hinge means, wherein said first cooperative hinge means are disposed on one side of said first mouth opening and said second cooperative hinge means are disposed on the other side of said first mouth opening.

36. The apparatus according to claim 32 wherein said cooperative snap-fit means comprise a plurality of outwardly extending snap fit members provided on one of said head members and a plurality of snap-fit openings provided on the other of said head members for receiving said plurality of outwardly extending snap fit members.

* * * * *